United States Patent [19]

Arii et al.

[11] Patent Number: 4,854,121
[45] Date of Patent: Aug. 8, 1989

[54] COMBINED CYCLE POWER PLANT CAPABLE OF CONTROLLING WATER LEVEL IN BOILER DRUM OF POWER PLANT

[75] Inventors: Michio Arii; Yoshihisa Kamataki; Shirou Hino; Shoji Matsui, all of Yokohama, Japan

[73] Assignee: Kabushiki Kaisha Toshiba, Kawasaki, Japan

[21] Appl. No.: 105,126

[22] Filed: Oct. 6, 1987

[30] Foreign Application Priority Data

Oct. 9, 1986 [JP] Japan ............................ 61-154347[U]
Jan. 30, 1987 [JP] Japan ............................ 62-11432[U]
Mar. 19, 1987 [JP] Japan ............................ 62-62504

[51] Int. Cl.⁴ .................................................. F02C 6/18
[52] U.S. Cl. .................................. 60/39.182; 122/7 R
[58] Field of Search ..................... 60/39.182, 39.181; 122/7 R

[56] References Cited

U.S. PATENT DOCUMENTS

| | | | |
|---|---|---|---|
| 3,150,487 | 9/1964 | Mangan et al. | 60/39.182 |
| 3,955,358 | 5/1976 | Martz et al. | 60/39.182 |
| 4,207,842 | 6/1980 | Kehlhofer | 60/39.182 |
| 4,242,989 | 1/1981 | Chamberlain | 122/451 R |
| 4,353,204 | 10/1982 | Arakawa | 60/39.182 |

FOREIGN PATENT DOCUMENTS 56-12903 2/1981 Japan.

*Primary Examiner*—Louis J. Casaregola
*Attorney, Agent, or Firm*—Oblon, Fisher, Spivak, McClelland & Maier

[57] ABSTRACT

A combined cycle power plant capable of controlling a water level of a boiler drum of the power plant generally comprises a gas turbine system, a system turbine system, and a waste heat recovery system which are thermally linked with a feed water supply line and a steam supply line. The waste heat recovery system includes a boiler which is provided with a drum containing a feed water. The power plant further comprises a drum water level control system for stably maintaining the water level by selectively carrying out respective controlling modes in accordance with operation conditions such as an ordinary operation time, an operation stop time and a loss of fire of the gas turbine system by for example processing control signals in utilization of a change-over switch.

3 Claims, 10 Drawing Sheets

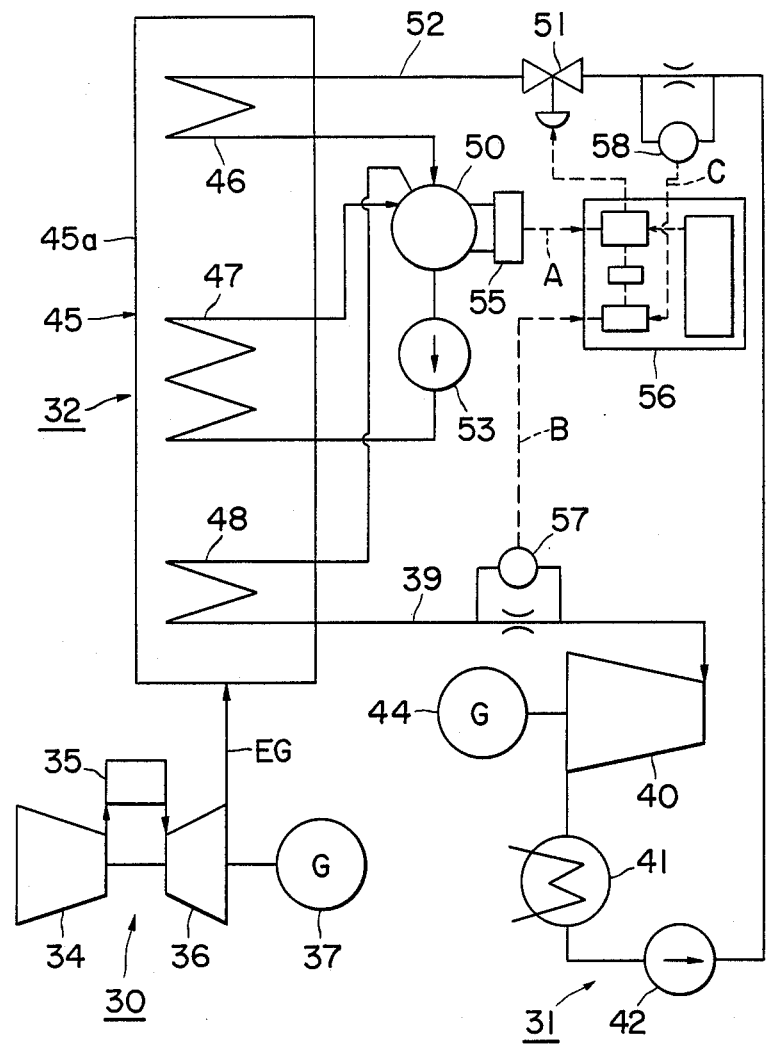
F I G. 1

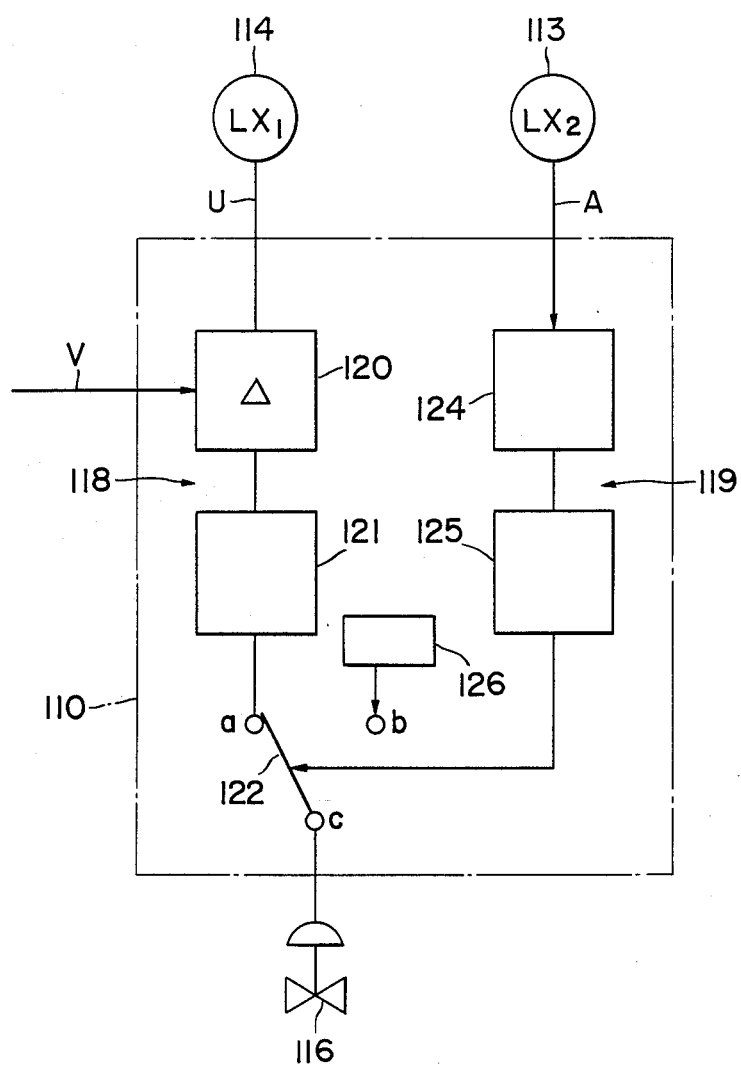
F I G. 10

COMBINED CYCLE POWER PLANT CAPABLE OF CONTROLLING WATER LEVEL IN BOILER DRUM OF POWER PLANT

BACKGROUND OF THE INVENTION

This invention relates to a combined cycle power plant comprising a combined gas turbine system and steam turbine system, and more particularly to a water level control system for controlling a water level in a boiler drum incorporated in the combined cycle power plant.

In a conventional power generation plant, a generator is driven by a steam turbine incorporated in a steam turbine plant or a gas turbine incorporated in a gas turbine plant, but in recent years, a combined cycle power plant in which a steam turbine is driven by waste heat from a gas turbine has been developed. Such combined cycle power plant has been expected in a viewpoint of an improved high heat efficiency in comparison with the ordinary steam power plant generator plant.

FIG. 11 shows a diagrammatic view of a conventional combined cycle power plant, which generally comprises a gas turbine system 1, a waste heat recovery system 2, and a steam turbine system 3.

The exhaust gas EG used for driving a gas turbine 4 of the gas turbine system 1 is supplied to a waste heat recovery boiler 5 as a heat recovery steam generator of the waste heat recovery system 2, and the exhaust gas EG is then cooled by the heat exchanging operation during the passing through a super heater 6, an evaporator 7, and an economizer 8 arranged in this order in the waste heat recovery boiler 5. The heat-exchanged and cooled gas is thereafter exhausted in the atmosphere.

The waste heat recovery boiler 5 of the waste heat recovery system 2 is also equipped with boiler drum 9 which is connected to the evaporator 7 through a circulation pump 10, thus constituting a closed circuit. To the drum 9, a water level detector 9A is operatively connected to detect the water level in the drum 9, and the detector 9A transmits a signal A representing the water level to a water level controller 11, into which are inputted a signal B representing steam flow rate from a steam flow meter 12 and a signal C representing feed water flow rate from a feed water flow meter 13 as well as the signal A. The controller 11 then transmits a signal D in response to these signals A, B and C to a feed water control valve 15 provided for a feed water line 14 to carry out the open-close control of the control valve 15.

The feed water regulated in the flow rate by the feed water control valve 15 is once fed into the economizer 8 to be preheated and then guided into the drum 9. The water stored in the drum 9 is fed into the evaporator 7 through the circulation pump 10 to evaporate the same into the steam, which is again returned to the drum 9. The steam returned to the drum 9 is separated there into gas and liquid components, and the liquid component is again fed into the evaporator 7 and the gas, i.e. steam, is fed into the super heater 6 to obtain a dried steam, which is then fed into a steam turbine 17 through a steam line 16.

The steam fed into the steam turbine 7 drives a generator 18 and the steam utilized for driving the generator 18 is thereafter fed into a condenser 19 in which the used steam is condensed into the condensate. The condensate is fed into the economizer 8 as a feed water by the actuation of a condensate pump 20, while the feed water rate or amount being adjusted by the open-close control of the feed water control valve 15.

The feed water control valve 15 is generally controlled by a system shown in FIG. 12 as a block diagram. Referring to FIG. 12, to the drum water level controller 11 are respectively inputted the signal A from the water level detector 10, the signal B from the steam flow meter 12 and the signal C from the feed water flow meter 13. The steam flow rate signal B and the feed water flow rate signal C among these signals A, B and C are compared in a comparator 21, and the thus obtained comparison signal is differentiated by a differentiator 22 and then transmitted into a PID (proportion integral-differential) controller 23.

In addition to the differentiated signal, the drum water level detection signal A and a drum water level preset signal E are inputted into the PID controller 23, in which these signals are processed and the valve control signal D is then transmitted to the feed water control valve 15.

The open-close operation of the feed water control valve 15 is controlled in response to the valve control signal D from the drum water level controller 11 thereby to control the feed water amount into the economizer 8, and even in case the load of the waste heat recovery system 2 varies at the ordinary operation time of the gas turbine system 1, the water corresponding to this load variation is fed appropriately, so that the water level in the drum 9 can be kept relatively stable.

As described hereinabove, since the water level controller for the boiler drum of the conventional type controls the feed water control valve 15 by the water level controller 11 in response to the signals A, B, and C representing three main functions mentioned hereinbefore, the water level of the drum 9 can be properly controlled during the ordinary operation of the gas turbine system 1 and the waste heat recovery system 2.

However, in case the gas turbine system 1 accidentally fires which may result in the operation stop of the system and the waste gas EG is not fed to the waste heat recovery system 2 as a heat source therefor, the steam passing the evaporator 7 cannot be evaporated, thus damaging the evaporating function, and a rapid phase variation is caused to the evaporated steam. The steam is accordingly condensed and the volume thereof is reduced or shrunk, and this shrinkage of the steam volume causes the water in the drum 9 to flow into the evaporator 7 to adversely extremely lower the water level in the drum 9 or the circulation pump 10 is overloaded thereby to accidentally trip the waste heat recovery system 2.

When the water level in the drum 9 lowers, it is necessary to widely open the feed water control valve, and the condensate of the amount more than the predetermined amount will have to be fed into the drum 9 to supplement the water therein. For this reason, the water level in the condenser 15 extremely lowers, and accordingly, when the combined cycle plant is regenerated, the condensate pump 20 is idly operated to result in a generation of an operational fault such as cavitation.

SUMMARY OF THE INVENTION

A primary object of this invention is to eliminate disadvantages or drawbacks of the conventional power plant described above and to provide a combined cycle power plant having a water level control system for a boiler drum of the power plant capable of stably maintaining the water level in the drum and substantially constantly keeping the water level to a predetermined level even in case of an accidental fire of the gas turbine system and the operation stop thereof.

Another object of this invention is to provide a combined cycle power plant having a water level control system for the boiler drum of the power plant capable of surely preventing the rapid lowering of the water level in the drum of a water heat recovery boiler and smoothly and stably reoperating the combined cycle power plant even in case of an accidental fire of the gas turbine system and the operation stop thereof.

A further object of this invention is to provide a combined cycle power plant having a water level control system for the boiler drum of the power plant capable of effectively preventing the lowering of the water level in the condenser while stably maintaining the water level in the waste heat recovery boiler.

These and other objects can be achieved according to this invention by providing a combined cycle power plant capable of controlling a water level in a boiler drum of the power plant comprising a gas turbine system equipped with a gas turbine, a steam turbine system equipped with a steam turbine and a condenser, and a waste heat recovery system which thermally links the gas turbine system to the steam turbine and is equipped with a waste heat recovery boiler for generating steam to drive the steam turbine in utilization of waste heat from the gas turbine system, the waste heat recovery boiler being provided with a drum containing feed water therein, and the power plant further comprising a drum water level control system for stably maintaining the water level in case of an ordinary operation time, an operation stop time, and a loss of fire of the gas turbine system. The drum water level control system can be controlled in several controlling modes in accordance with the operation conditions of the turbine system by processing control signals in utilization of a change-over switching means.

The further preferred embodiments, alternations or modifications according to this invention will become apparent by descriptions made hereinbelow in conjunction with the accompanying drawings.

BRIEF DESCRIPTION OF THE DRAWINGS

In the accompanying drawings:

FIG. 1 is a schematic diagram of a combined cycle power plant equipped with a boiler drum water level control system of the first embodiment according to this invention;

FIG. 10 is a block diagram representing a control mode of a drum water level control system to be incorporated in the boiler drum water level control system shown in FIG. 9;

DESCRIPTION OF THE PREFERRED EMBODIMENTS

Figure 2:
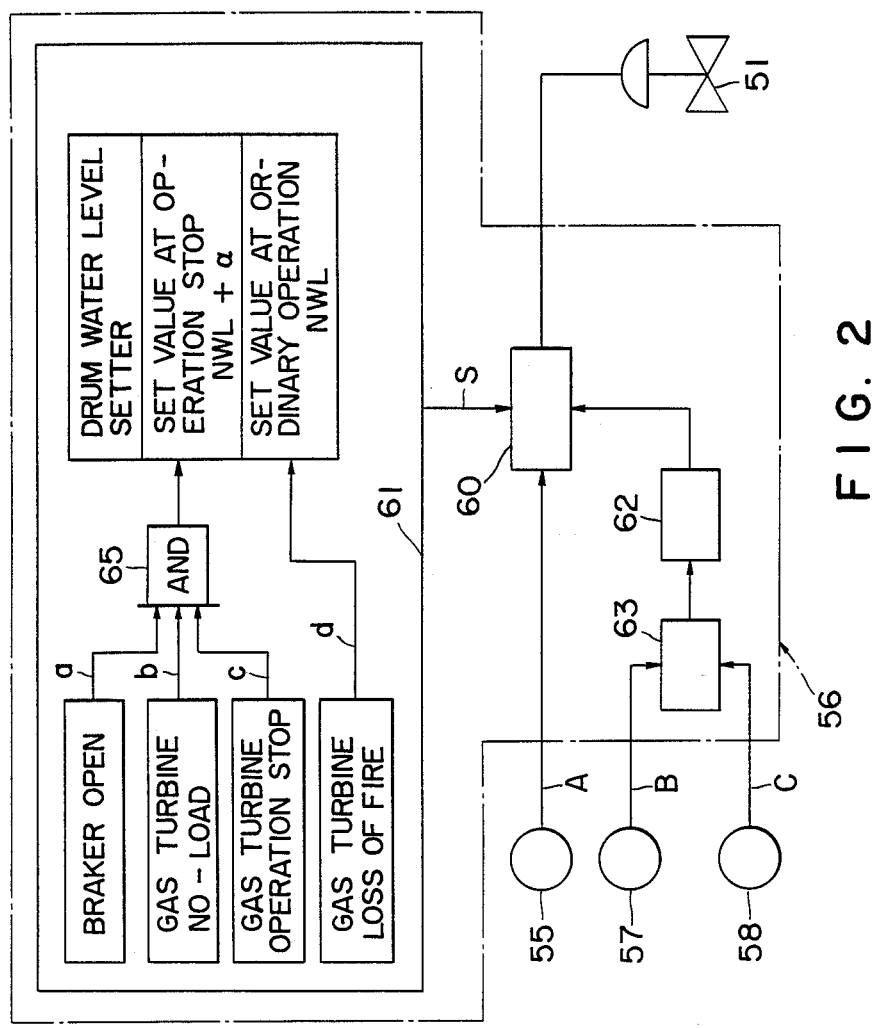
FIG. 2 is a block diagram representing a control mode of a drum water level control system to be incorporated in the boiler drum water level control system in FIG. 1.

FIG. 1 is a schematic diagram of a combined cycle power plant to which a boiler drum water level control system of this invention is applied, and the illustrated combined cycle power plant generally comprises a gas turbine system 30, a steam turbine system 31, and a waste heat recovery system 32.

The gas turbine system 30 is of the so-called Brayton Cycle type which comprises an air compressor 34, a burner 35 for burning a mixture of the compressed air and a fuel such as heavy oil, and a gas turbine 36 driven by a combustion gas, and the gas turbine 36 of the combustion gas burned in the burner 35.

The steam turbine system 31 is of the so-called Rankine Cycle type which generally comprises a steam control valve, not shown, a steam turbine 40, a condenser 41, and a condensate pump 42 all of which are provided for or incorporated in a steam feed line 39, and a generator 44 is driven by a driving force converted from the steam energy in the steam turbine 40.

The waste heat recovery system 32 thermally connects the gas turbine system 30 to the steam turbine system 31 and operates to generate a steam adapted to drive the steam turbine system 31 in utilization of the waste heat from the gas turbine system 30. The waste heat recovery system 32 is provided with a waste heat recovery boiler 45 as a heat recovery steam generator. The waste heat recovery boiler 45 comprises a boiler casing 45a in which an economizer 46, an evaporator 47, and a super heater 48 are arranged, and is also provided outside of the casing 45a with a drum 50 and a feed water control valve 51 arranged for a feed water line 52 which feeds the condensate from the condenser 41 to the economizer 46. The drum 50 is operatively connected to the evaporator 47 through a circulation pump 53, thus constituting a closed circuit.

The operating gas working in the gas turbine 36 of the gas turbine system 30 is guided in the waste heat recovery boiler 45 as the exhaust gas which thereafter performs the heat exchanging operation during the passing through the super heater 48, the evaporator 47, and the economizer 46 arranged in this order in the waste heat recovery boiler 45. The thus cooled exhaust gas is finally exhausted outwardly of the plant from a chimney, not shown.

A water level detector 55 such as a water level meter for measuring the water level in the drum 50 is provided for the drum 50 of the waste gas recovery boiler 45, and the water level detected by the water level detector 55 is outputted therefrom as a drum water level detecting signal A to a drum water level controller 56. To the water level controller 56 are also inputted a steam flow rate signal B from a steam flow meter 57 provided for the steam line 39 and a feed water flow rate signal C from a feed water flow meter 58 provided for a feed water line 52 in addition to the water level detection signal A.

The water level controller 56, as best illustrated in FIG. 2, comprises a valve controller 60 as a PID controller, a drum water level setter 61 which transmits a water level setting signal S to the valve controller 60 in case of loss of fire (or flameout) and the operation stop of the turbine system as well as the ordinary operation time of the gas turbine system 30, and a comparator 63 electrically connected to the valve controller 60 through a differentiator 62. To the comparator 63 are inputted the aforementioned steam flow rate signal B and the feed water flow rate signal C which are comparatively operated in the comparator 63, and the obtained operated signal is differentiated in the differentiator 62 and, thereafter, inputted into the valve controller 60.

The drum water level setting signal S from the water level setter 61 is further inputted in the valve controller 60 in addition to the three functional signals A, B and C referred to hereinabove. Namely, when gas turbine system 30 is in the stop operation time, the water level setter 61 receives a breaker open signal a of the gas turbine system 30, a no-load signal b thereof, and a gas turbine stop signal C, respectively, and transmits a valve open-close signal as the water level setting signal 5, when these three signals a, b and c are all inputted, so as to open the feed water control valve 51 through an AND circuit 65 to the degree of opening more than the prescribed value. In general, the normal water level NWL is predetermined as a water level of the drum 50 and the feed water control valve 51 is regulated so as to correspond to the water level NWL in the ordinary turbine operation.

However, even in a case where the degree of opening of the feed water control valve 51 is regulated so as to correspond to the normal water level NWL, when the operation of the gas turbine system stops, the steam in the evaporator 47 is condensed and shrunk, and the water in the drum 50 likely flows in the evaporator 47 thereby to rapidly lower the water level in the drum 50 below the normal water level NWL. For this reason, the feed water control valve 51 operates to compensate for the rapid lowering of the water level in the drum 50 by opening the feed water control valve 51 to the degree of opening α more than the prescribed valve opening value.

Under the stop operation time of the gas turbine system 30, the water level setter 61 transmits an output signal S to the valve controller 60 so as to open the same with degree of opening more than the prescribed value, and in response to the output signal S, the valve controller 60 instructs the feed water control valve 51 prior to the valve open-close signal based on the three functional signals A, B and C. According to the instructions, the water level in the drum 50 can be always kept to the prescribed water level even when the excessive water flows to the drum 50 and the operation of the gas turbine system 30 stops.

At the operation starting time of the gas turbine system 30, the burner 35 accidentally fires and in case of loss of fire, the water level setter 61 is switched by a switching means, not shown. A signal d representing the loss of fire is transmitted to the water feed control valve 51 to carry out the ordinary water level control as a prescribed valve opening signal, i.e. a signal representing the valve opening based on the normal water level NWL of the drum. Thus, the loss of fire of the burner 35 at the operation starting time of the gas turbine system 30 is distinguished from the loss of fire during the turbine operating time.

As described hereinabove, according to the combined cycle power plant based on this invention, the valve open-close signal generated on the basis of the three functional signals, i.e. drum water level signal A, steam flow rate signal B and feed water flow rate signal C, is transmitted to the feed water control valve 51 during the ordinary operation of the gas turbine system 30 thereby to control the water flow rate or amount passing the control valve 51, thus being capable of controlling the water level in the drum 50.

When the operating state of the gas turbine system 30 approaches the stop operation condition, the output singal S from the setter 61 instructing the opening degree of the valve more than the prescribed opening degree is given in the order of priority, to the feed water controlling valve 51 under the condition that the breaker open signal a of the gas turbine system 30, the no-load signal b thereof and the gas turbine stop operation singal c are all inputted into the setter apart from the three functional signals A, B and C. In this manner, when the feed water control valve 51 opens to the opening degree more than the prescribed value, water of an amount more than the ordinary feed water flow amount flows in the drum 50, thus preventing the lowering of the water level in the drum at the operation stop time of the gas turbine and being capable of always maintaining the prescribed water level in the drum.

Figure 3:
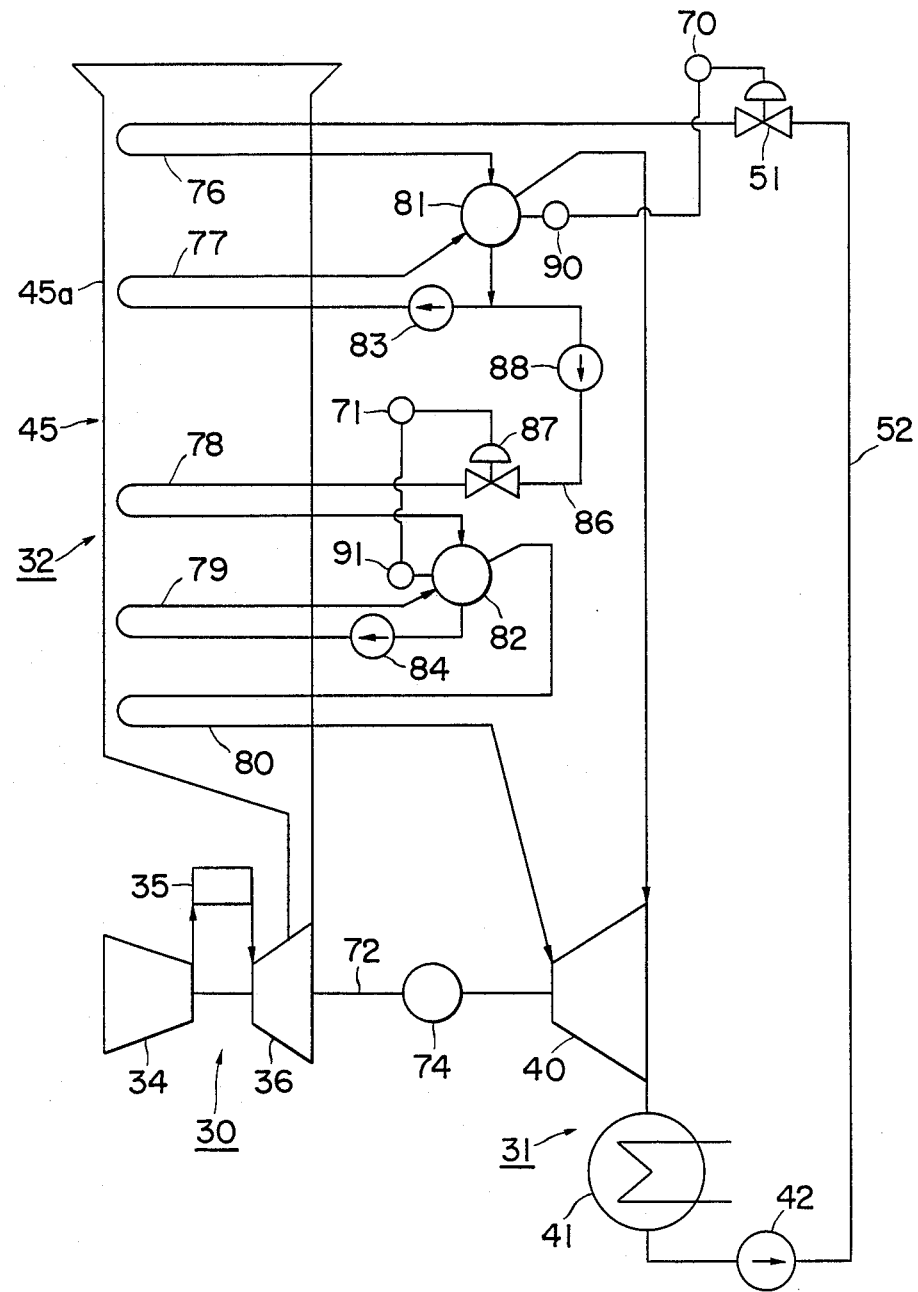
FIG. 3 is a schematic diagram of a combined cycle power plant equipped with a boiler drum water level control system of the second embodiment according to this invention.

FIG. 3 is a diagrammatic representation of the second embodiment of the water level control system of the boiler drum according to this invention.

The combined cycle power plant of the second embodiment shown in FIG. 3 is basically different from that of the first embodiment shown in FIG. 1 in that the former comprises the gas turbine system 30 and the steam turbine system 31 which are connected to the common single drive shaft 72 to drive a generator 74, and moreover, the combined cycle power plant of the second embodiment is provided with water level controllers 70 and 71 each having a construction different from that of the water level controller 56 shown in FIG. 1. Since the other constructional parts or members of both the embodiments are substantially the same with each other, the descriptions or explanations of these parts are eliminated hereunder with the second embodiment by adding the same reference numerals as used for the first embodiment.

The water heat recovery boiler 45 as a heat recovery steam generator to be equipped for the waste heat recovery system 32 comprises a boiler casing 45a in which the first economizer 76, the first evaporator 77 the second economizer 78, the second evaporator 29, and the super heater 80 are arranged in this order from the feed water inlet side towards the feed water outlet side of the boiler casing 45a.

The waste heat recovery boiler 45 is provided with a low pressure drum 81 and a high pressure drum 82, in which the low pressure drum 81 is connected to the first evaporator 77 through a circulation pump 83 to constitute a closed circuit and the high pressure drum 82 is connected to the second evaporator 79 to also constitute a closed circuit.

The feed water control valve 51 is incorporated in the feed water line 52 connecting the steam turbine system 31 to the first economizer 76 of the waste heat recovery system 32, and a high pressure feed water control valve 87 is incorporated in a high pressure feed water line 86 connecting the low pressure drum 81 to the second economizer 78. The reference numeral 88 designates a feed water pump.

The low and high pressure drums 81 and 82 are respectively provided with water level detectors 90 and 91 to detect the actual water levels of the drums 81 and 82, and when the detectors 90 and 91 detect the water levels being over or below the prescribed water levels, drum water level signals, as valve open-close signals, are transmitted to the feed water control valve 51 and the high pressure feed water control valve 87 through the drum water level controlling meters 70 and 71 as the drum water level controllers, thereby to control or adjust the water levels in the drums 81 and 82, respectively.

In the actual operation, however, when the burner 35 accidentally fires during the operation of the gas turbine system 30 and hence the supply of the exhaust gas to the waste heat recovery boiler 45 stops, the steams staying in the first and the second evaporators 77 and 79 are cooled and condensed to reduce the volumes thereof. Accordingly, the water in the low and high pressure drums 81 and 82 flow in the evaporators 77 and 78, respectively and the water levels in the drums 81 and 82 rapidly lower in spite of no occuurence of specific accident.

Figure 4:
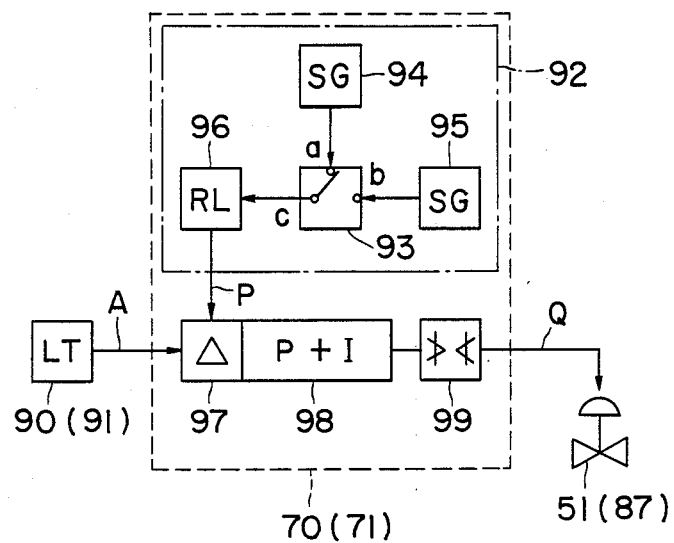
FIG. 4 is a block diagram representing a control mode of a drum water level control system to be incorporated in the boiler drum water level control system shown in FIG. 3.

In consideration of these matters, with the combined cycle power plant of the second embodiment, the drum water level controlling meters 70 and 71 are constructed as drum water level controllers as shown in FIG. 4 and provided with a drum water level setter 92 transmitting a predetermined drum water level setting signal P. Namely, the drum water level setter 92 of the water level controlling meter 51, for example, is provided with a change-over switch 93 to which are connected the first setter 94 for setting the water level of the drum at the ordinary operation and the second setter 95 for setting the drum water level at the abnormal operation time such as loss of fire during the operation of the plant.

The change-over switch 93 is operatively connected through a rate limiter 96 to a comparator 97, into which an actual drum water level detecting signal A is inputted from the water level detector 90 and processed to be operated or calculated. The resulting output is then processed by the PI (proportional integral) operation of a valve controller 98 as a PI or PID controller, and a valve closing signal Q is transmitted therefrom to the feed water controlling valve 51 through a limiter 99. The controlling mode or manner of the high pressure feed water controlling meter 87 can be performed by substantially the same manner as that of the control valve 51 described hereinabove.

The change-over switch 93 operates to enable the a-c contact to be conductive during the ordinary operation of the gas turbine system 30, but in the loss of fire of the burner 35 during this operation, the change-over switch 93 is switched to enable the b-c contact to be conductive. In response to the signal representing the loss of fire of the burner 35, a setting signal from the second water level setter 95 is outputted, the setting signal then being transmitted to the rate limiter 96, from which a rate signal P is outputted to the comparator 97.

The rate signal P inputted in the comparator 97 is compared therein with the actual drum water level detecting signal A transmitted from the water level detector 90, and when the resulting compared signal indicates a deviation, the deviation is PI-operated by the valve controller 98 and the valve closing signal Q is created thereby to close the feed water control valve 51. The high pressure feed water control valve 87 is similarly controlled by the drum water level controlling meter 91 so as to be closed.

Figure 5:
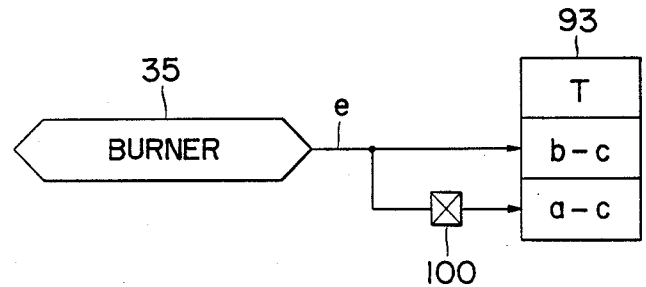
FIG. 5 is a block diagram showing the operation of a change-over valve provided for the boiler drum water level control system described above.

FIG. 5 is a block diagram showing the operation of the change-over switch 93 in loss of fire of the burner 35 during the operation of the gas turbine system 30.

At the ordinary operation time, the change-over switch 93 operates so as to enable the contact a-c on the side of the water level setter 94 of the first drum to be conductive by means of a NOT-circuit 100, and during the ordinary operation, in case loss of fire of the burner 35, the fire signal e is transmitted to switch the change-over switch 93 to enable the contact b-c on the side of the water level setter 95 of the second drum to be conductive. Thus, in response, the water level setting signal from the setter 95 is transmitted to the rate limiter 96.

Figure 6:
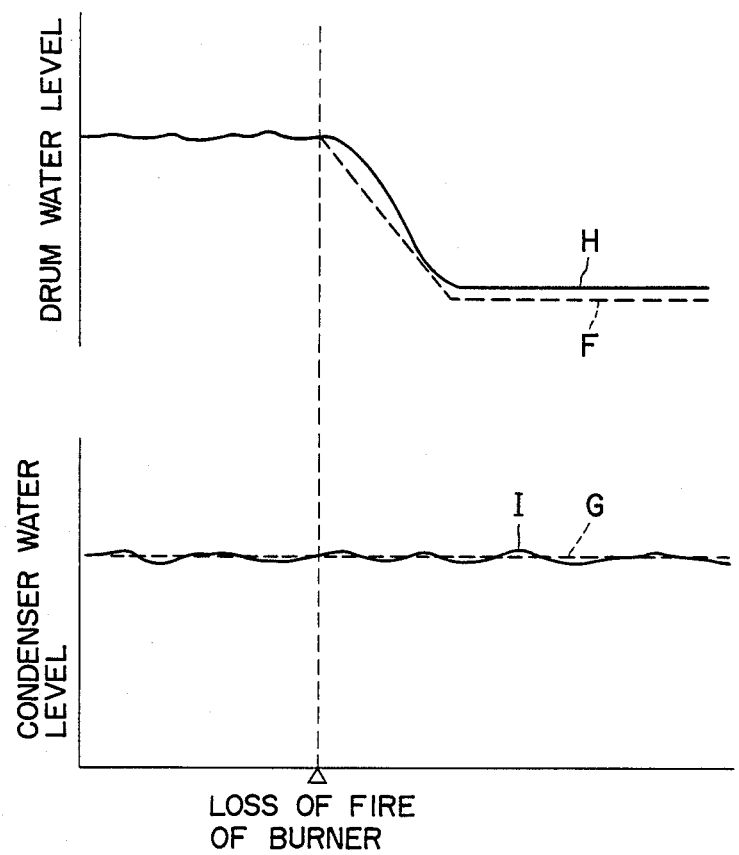
FIG. 6 is a graph showing the relationship between the water level setting value and the actual water level.

Accordingly, in the case where the burner 35 accidentally fires during the operation of the gas turbine system 30, the actual drum water level and condenser water level are shown with solid lines H and I, respectively as shown in FIG. 6 with respect to the drum water level setting value F and the condenser water level setting value G. The actual water levels H and I are obtained by closing the feed water control valves 51 and 87 in response to the valve closing signals Q from the water level controlling meters 70 and 71, respectively, and the water level setting values F and G accord substantially with the actual drum water level H and the actual condensate water level I.

Namely, the boiler drum water level control system is equipped with the change-over switch 93 for switching the output from the second water level setter transmitting to the water level controller in response to the output signal of the first water level setter at the ordinary operation time and the signal representing the loss of fire of the burner of the gas turbine system. Accordingly, at the loss of fire of the burner, the change-over switch 93 is switched thereby to throttle the output from the second water level setter 95 by means of the rate limiter 96, and a signal from the rate limiter 96 is operated to create the valve closing signal Q, thus preventing the feed water control valve from being unnecessarily opened.

With the boiler drum water level control system, as described hereinabove, the output from the first water level setter 94 at the ordinary operation time and the second water level setter 95 at the loss of fire of the burner 35 are utilized in a separated switching manner by means of the change-over switch 93, and in addition, the rate limiter 96 is incorporated so as not to generate an output as a rapid variable signal from the second water level setter 95 to the feed water control valves 51 and 87. Accordingly, even in case of the loss of fire of the burner 35, the water levels of the respective drums 81 and 82 do not rapidly lower and gradually vary, and as this result, the lowering of the water level of the condenser 41 can be effectively prevented. The unnecessary tripping of the pump 42 or the like can also be prevented and the operation excellent in the regeneration ability can be smoothly and continuously carried out.

Figure 7:
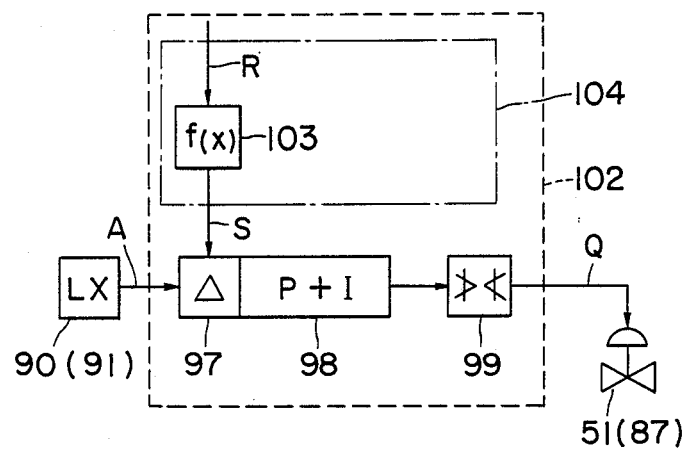
FIG. 7 is a schematic diagram showing one modification of the boiler drum water level control system shown in FIG. 4.
Figure 8:
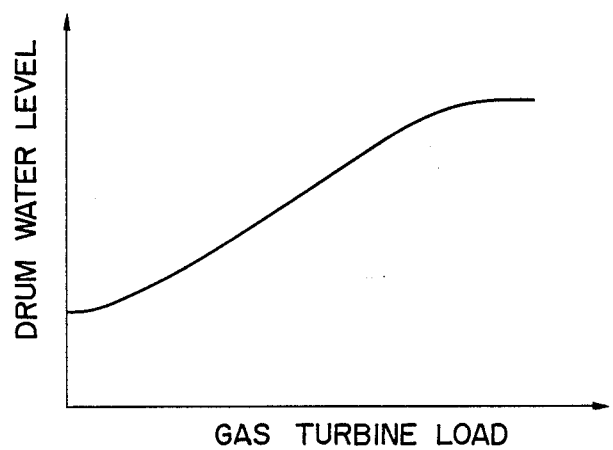
FIG. 8 is a graph showing the relationship between the drum water level and the gas turbine load.

FIGS. 7 and 8 show an example of a modification of the water level controller. The water level controller 102 of this modification utilizes a gas turbine load signal R instead of the loss of fire signal from the burner and is provided with a function generator 103 having the function of the load R in a drum water level setter 104 of the controller 102. These matters are based on the fact that the drum water level change is substantially in proportion to the gas turbine load as shown by the graph of FIG. 8. Therefore, when the gas turbine load R changes, the function generator 103 operates to output a signal S in response to the change of the load R and the signal S is processed to create the valve closing signal Q in the identical manner to that described with reference to FIG. 4 thereby attaining substantially the same effects and function as mentioned in the case of FIG. 4.

The third embodiment of the boiler drum water level control system according to this invention will be described hereunder in conjunction with FIG. 9.

The boiler drum water level control system of the third embodiment comprises a condenser hot-well water level controller 110 as a drum water level controller which can control the water level of the drum 50 as well as the water level of the condenser 41. The combined cycle power plant applying the drum water level control system of this embodiment is of a single shaft type in which the gas turbine system 30 and the steam turbine system 31 for driving a generator 111 are operatively connected through a common drive shaft 112, as shown in the first embodiment of FIG. 1, so that the like reference numerals are added to the elements or equipments to those used in FIG. 1, and the detailed description thereof is now omitted.

Figure 9:
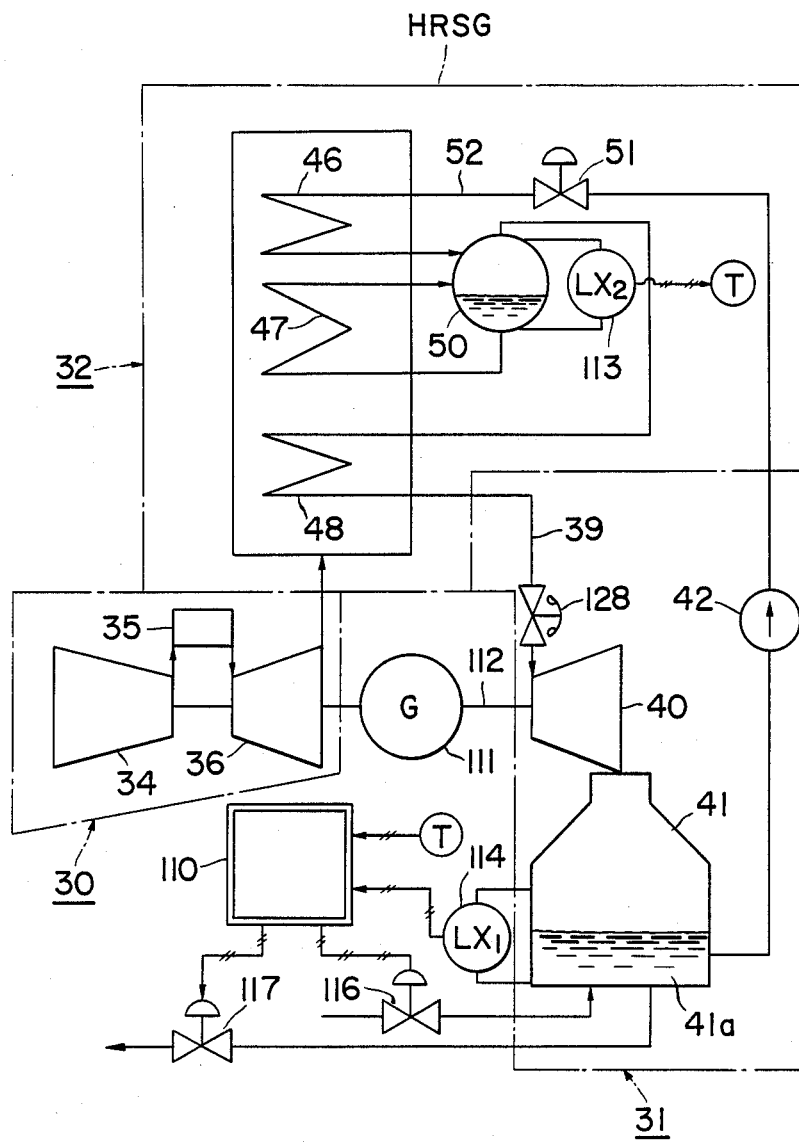
FIG. 9 is a schematic diagram showing a combined cycle power plant equipped with a boiler drum water level control system of the third embodiment according to this invention.

The drum 50 and the condenser 41 of the boiler drum water level control system of FIG. 9 are equipped with water level detectors 113 and 114, respectively, and a drum water level detecting signal A and a condenser hot-well water level detecting signal U respectively detected by the water level detectors 113 and 114 are both inputted into the condenser hot-well water level controller 110, which accordingly controls a make-up control valve 116 for supplying the make-up water to the condenser 41 and a spill out control valve 117 for spilling out the condensate from the condenser 41.

The condenser hot-well water level controller 110 operating as a drum water level controller comprises, as shown in in FIG. 10, a condensate water level control system 118 for making up the water shortage of the condenser 41 and a drum water level control system 119 for fully opening the make-up valve 116 in the lowering of the drum water level. The make-up control valve 116 are controlled by the condensate water level control system 118 and the drum water level control system 119.

The hot-well water level detecting signal U from the water level detector 114 of the condenser 41 is inputted into a comparator 120 of the control system 118, in which the signal U is compared with a hot-well water level setting signal V, and the compared difference is transmitted to a PID controller 121 as an error signal, which is therein controlled by the ordinary PID control or PI control manner. A control signal from the PID controller 121 is transmitted to a change-over switch 122 thereby to control the make-up control valve 116 at the ordinary operation time for making up the shortage water amount of the hot well of the condenser 41.

The drum water level detecting signal A from the detector 113 of the drum 50 is inputted into a rate delivery 124 of the drum water level control system 119 to operate the varying rate of the drum water level, and the thus operated rate signal is inputted into a rate comparator 125. The rate comparator 125 acts to operate the change-over switch to switch the connection of the contact b-c when the inputted drum water level rate varies below the predetermined preset value. According to this switching operation, the make-up valve 116 is fully opened to rapidly supply a large volume of feed water into the condenser 41 for making up the shortage of the drum water level.

When the change-over switch 122 is in the connecting condition of the contact a-c, the control signal from the PID controller 121 is outputted as a command signal of the opening degree of the make-up control valve 116 thereby to control the water shortage of the hot well so that the hot-well water level of the condenser 41 is a set value. On the other hand, when the change-over switch 122 is switched to enable the connection of the contact b-c, a valve full-open signal is outputted from the rate comparator 125 to the make-up valve 116 as a command signal of the opening degree of the valve 116.

Figure 11:
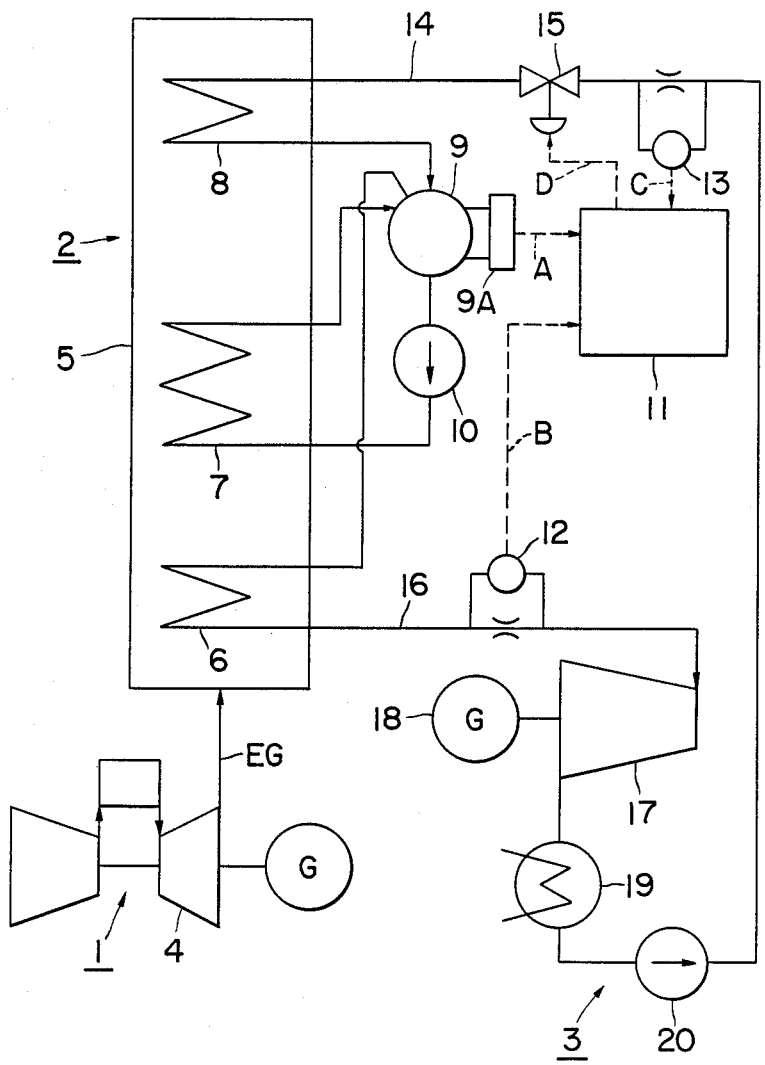
FIG. 11 is a schematic diagram showing a combined cycle power plant equipped with a conventional type of a boiler drum water level control system.
Figure 12:
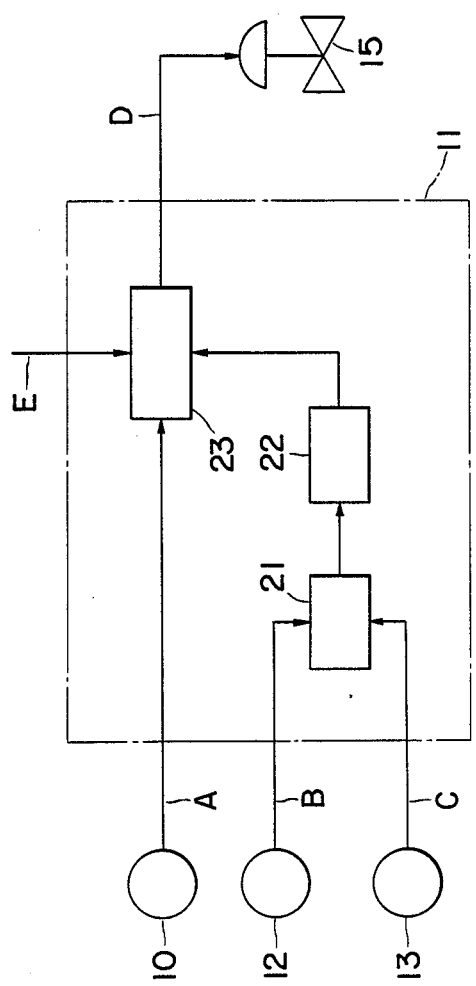
FIG. 12 is a block diagram representing a control mode of the boiler drum water level control system shown in FIG. 11

With the conventional combined cycle power plant of the type shown in FIGS. 11 and 12, at the operation finishing time, since the drum water level of the waste recovery system 32 is rapidly lowered and a water supply of the amount more than the lowered water level is supplied from the hot well 41a of the condenser 41, the water level of the hot well 41a lowers rapidly and extremely, and accordingly, when the combined cycle power plant is reoperated, the condensate pump 42 is likely idly operated, which may result in an occurrence of an accident such as cavitation. With the boiler drum water level control system according to this invention, however, the water level detector 113 for detecting the water level of the drum 50 is connected to the water level controller 110 for the condenser hot well, and accordingly, when the drum water level rapidly lowers, hence, the drum water level rate becomes negative, and this rate becomes below the setting value of the rate comparator 125, the make-up control valve 116 is fully opened to supply a large amount of feed water into the hot well 41a of the condenser 41, thus being capable of preventing the rapid lowering of the water level of the drum 50 as well as the lowering of the water level of the hot well of the condenser 41.

The spill-over control valve 117 is opened by the hot-well water level controller 110 in case of the excessive water level of the condenser 41 to draw out the exceeding water amount of the hot well 41a.

As described hereinabove, the boiler drum water level control system of this invention is provided with the water level controller 110 for the condenser hot well, and the water level controller 110 is equipped with the condenser water level controlling system 118 which imparts the valve opening signal to the make-up control valve 116 for making up the shortage amount of water to the hot well 41a of the condenser 41 and with the drum water level controlling system 119 which imparts the valve full-open signal to the make-up control valve 116 at the drum water level shortage time. Both the water level controlling system 118 and 119 are switched by the change-over switch 122 to make up the shortage of the water level of the drum 50, thus maintaining the stable water level of the drum 50. The reference numeral 128 in FIG. 9 designates a steam control valve provided for the steam line 39.

It will be understood by those skilled in the art that the present invention is not limited to the embodiment described hereinbefore in conjunction with the accompanying drawings and the other changes and modifications may be made without departing from the scope of the apended claims.

What is claimed is:

1. A combined cycle power plant capable of controlling a water level in a boiler drum of the power plant comprising:

a gas turbine system equipped with a gas turbine;

a steam turbine system equipped with a steam turbine and condenser;

a waste heat recovery system which thermally links said gas turbine system to said steam turbine and is equipped with a waste heat recovery boiler for generating steam to drive said stem turbine in utilization of waste heat from said gas turbine system, said waste heat recovery boiler being provided with a drum containing feed water therein; and a water level control system for controlling a water level in said drum so as to stably maintain the water level in case of an ordinary operation time, an operation stop time, and a flameout of fire of said gas turbine system, said drum water level control system comprising a drum water level setter for outputting a predetermined drum water level setting signal in response to a signal representing the fact of the flameout of the gas turbine system, a comparator for comparing the drum water level setting signal with an actual drum water level detecting signal transmitted from the water level detector provided for said drum and for transmitting a deviation signal based on the comparison of said drum water level setting signal and said actual drum water detecting signal, and a valve controller operatively connected to said comparator for operating said deviation signal thereby to transmit a valve open-close signal.

2. The power plant according to claim 1 wherein said drum water level setter comprises:

a first water level setting means for transmitting a predetermined first drum water level setting signal at the ordinary operation time of the gas turbine system, and a second water level setting means for transmitting a second drum water level setting signal in response to a signal representing the flameout of fire of the gas turbine system.

3. The power plant according to claim 1 wherein said drum water level setter further comprises a change-over switch for switching said first water level setting means to said second water level setting means at the flameout fire of the gas turbine system, a rate limiter for imparting rate limitation to the drum water level setting signal inputted through said change-over switch from said first and second water level setting means and transmitting a valve open-close signal obtained by operating the thus rate-limited signal, and a function generator for transmitting a drum water level setting signal in response to a gas turbine load signal generated from the gas turbine system.

* * * * *